(No Model.) 2 Sheets—Sheet 1.

J. H. WATSON.
DOUGH MIXER.

No. 496,925. Patented May 9, 1893.

Witnesses
Chas. F. Schmelz
E. M. Healy

Inventor
J. H. Watson
By Attorney
Louis W. Southgate (No Model.) 2 Sheets—Sheet 2.

J. H. WATSON.
DOUGH MIXER.

No. 496,925. Patented May 9, 1893.

Witnesses
Chas. F. Schmelz
E. M. Healy

Inventor
J. H. Watson
By Attorney
Louis W. Southgate

UNITED STATES PATENT OFFICE.

JOHN H. WATSON, OF WORCESTER, MASSACHUSETTS.

DOUGH-MIXER.

SPECIFICATION forming part of Letters Patent No. 496,925, dated May 9, 1893.

Application filed February 3, 1893. Serial No. 460,876. (No model.)

*To all whom it may concern:*

Be it known that I, JOHN H. WATSON, a citizen of the United States, residing at Worcester, in the county of Worcester and State of Massachusetts, have invented a new and useful Improvement in Dough-Mixers, of which the following is a specification.

The aim of this invention is to produce a new and improved dough mixer which may be used to rapidly and easily knead and mix dough and similar material.

To this end, the invention consists of the device described and claimed in this specification and illustrated in the accompanying two sheets of drawings, in which—

Figure 1:
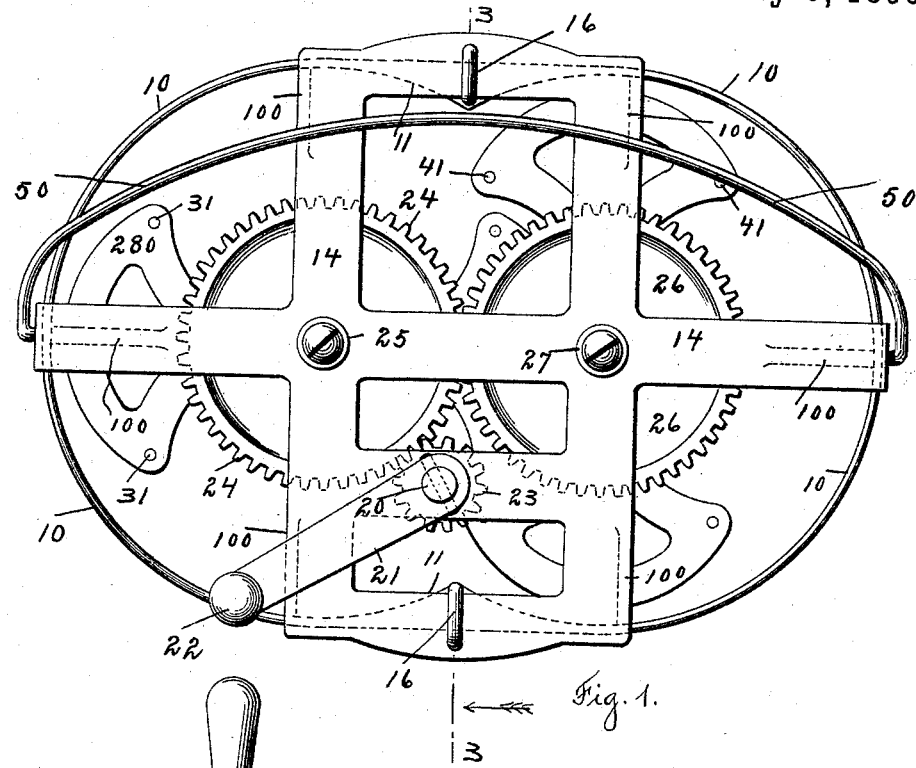
Figure 2:
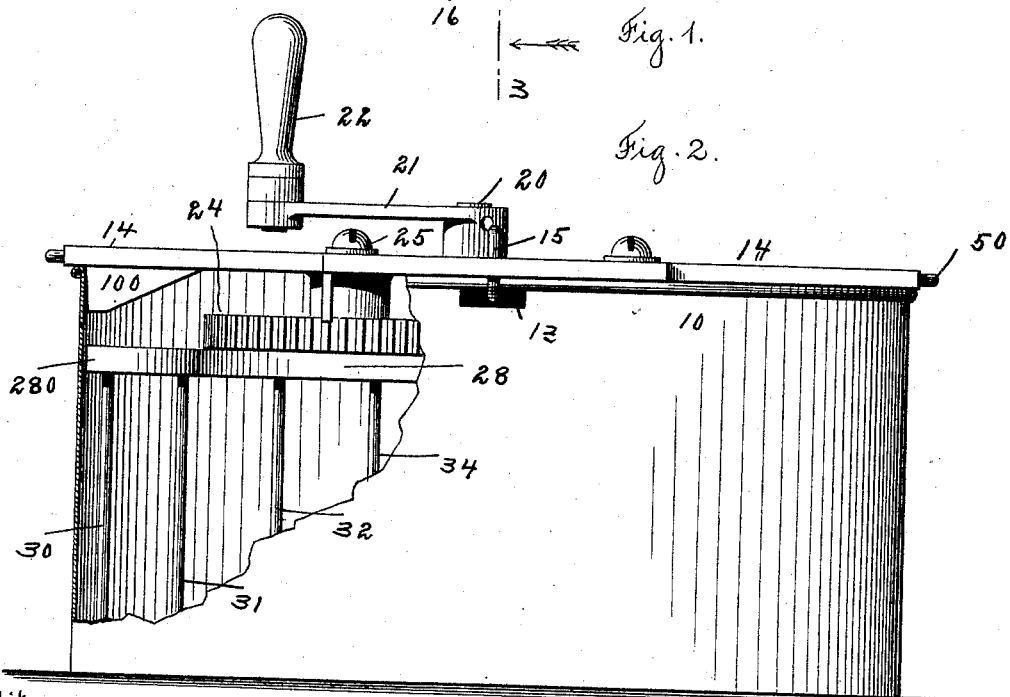
Figure 4:
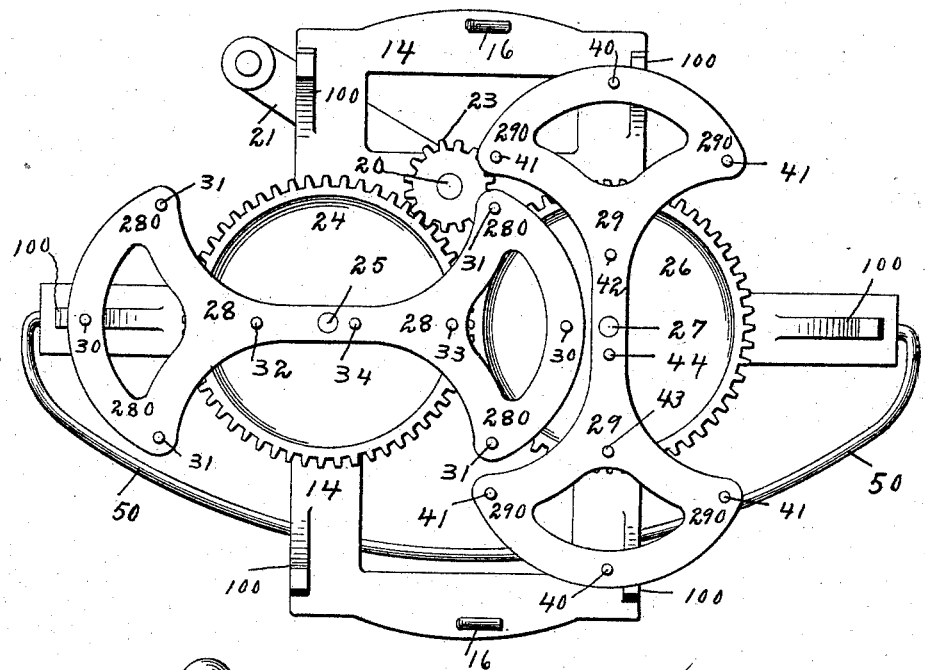
Figure 3:
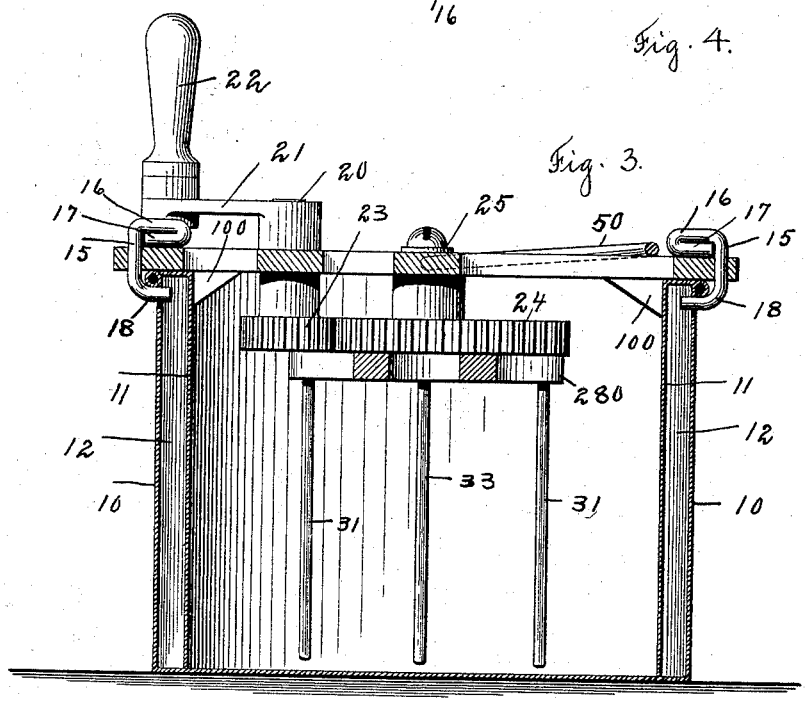

Figure 1 is a plan of my improved device. Fig. 2 is a side elevation partly in section. Fig. 3 is a bottom view of the apparatus detached from the pan, and Fig. 4 is a section on line 3—3 of Fig. 1 looking to the left.

Briefly stated, my invention consists of a frame which may be applied to the top of the pan, in which the materials to be mixed are placed, and this frame carries suitable gearing and two intermatched sections which have long and short radii, and which carry pins which project down into the pan; and these sections are adapted to be revolved by the gearing in opposite directions, so that the pins set on the short radii of one of said sections will coact with the pins set on the long radii of the other section, whereby the dough will be given a kneading or drawing out.

Referring to the drawings and in detail, 10 represents a pan, which is preferably made of the shape shown; and projecting in from the long sides of the pan are two false partitions 11, as shown, whereby there will be left spaces 12 between these partitions and the sides of the pan 10. Holes 13 are cut in the sides of the pan 10 opposite these partitions 11 for a purpose hereinafter noted. A frame 14 having suitable ribs or projections 100 adapted to enter into the pan to hold the frame 14 accurately in place carries the operative parts.

On each side of the frame 14 are arranged clamps 15, which are bent in on their lower ends as at 18, and back on themselves as at 16 and 17. The portion 18 of these clamps is adapted to enter into the hole 13 of the pan, and the portions 16, 17 of the same, form a sort of a spring, whereby, when the clamps are turned to the position shown in Fig. 3, the frame 14 will be tightly clamped to the top of the pan.

Journaled in the frame 14 is a short shaft 20, and on the top of the same is mounted an arm 21 which arm 21 carries the operating handle 22, and on the under side of this shaft 20 is mounted a pinion 23. Also journaled in the frame 14 are the shafts 25 and 27 on which are secured the large intermeshing gears 24 and 26, and the pinion 23 before referred to intermeshes with the gear 24.

On the lower ends of the shaft 25 is secured a peculiar shaped piece 28, and a similar shaped piece 29 is secured on the lower end of the shaft 27. The piece 28 has two large heads 280, as shown; and the piece 29 has similar heads 290. These pieces or sections are so arranged that the large heads of the same fit into one of the depressions or spaces between the heads of the other section, whereby the pieces 28 and 29 may revolve without touching each other, but still a portion of the same will always be very close together.

On the piece 28 are arranged pins in the following manner:—Pins 30 are set at the longest radius from the center 25 in the ends of the large heads, as shown; and pins 31 are set at the sides of the large heads 280, as shown, the two pins 30 being set on the same circle about the center of the shaft 25, and the four pins 31 being set on the same circle about the center of the shaft 25. In the narrow portion of the section on one side, is arranged one pin 32, and on the other side are arranged pins 33 and 34, these pins 32, 33, and 34 being all set at different distances from the center 25. On the other section are arranged pins 40—40, 41—41—41—41, and 42, 43 and 44, in a similar manner. It will be seen that by revolving the handle 21, the two sections will be made to revolve in opposite directions in and out of each other, and that the pins set on the large circle of one section will come close to the pins set on the short circle of the other section, whereby the dough will be given a peculiar drawing and kneading action, which will first force the dough together and then draw the same out.

The whole device can be removed from the pan by simply turning the clasps, before referred to, when the pins set in the two sections, may be readily drawn out of the dough, and the whole framing and its gearing and operating parts may be lifted up by the bail 50. Thus, my device is extremely efficient and simple for the purpose described.

The device may be used to mix any desired ingredients.

The details and arrangements of parts herein shown and described, may be greatly varied by a skilled mechanic without departing from the scope of my invention as expressed in the claims.

Having thus fully described my invention, what I claim, and desire to secure by Letters Patent, is—

1. The combination in a device of the character described of the pan, a framing on top of the pan, said framing carrying two sections arranged above the pan, said sections having pins projecting down into the pan, and gearing for revolving said sections, substantially as described.

2. The combination in a device of the character described of the pan, a framing adapted to be placed on top of the pan, said framing carrying two sections 28 and 29, said section 28 having the heads 280, and said section 29 having the heads 290, the heads of the two sections being adapted to intermesh, as described, of pins carried by said sections projecting into the pan, and gearing for revolving said sections in opposite directions, substantially as described.

3. The combination in a device of the character described of the pan 10, the framing 14 mounted on said pan, of the shafts 25 and 27 journaled in said framing, the shaft 25 carrying the section 28, and the shaft 27 carrying the section 29, of the intermeshed gears 24 and 26, mounted on said shafts, the pinion 23 intermeshing with the gear 24, means for revolving said pinion 23, said sections 28 and 29 having pins projecting within the pan, substantially as described.

4. The combination in a device of the character described, of the pan, a suitable framing mounted on top of the pan, said framing carrying the two sections 28 and 29, and gearing whereby said sections may be turned in opposite directions, said sections having each two large heads which intermesh as described, pins mounted on each of said sections projecting into the pan, the pins set on the long radii of one section being adapted to coact with the pins set on the short radii of the other section, substantially as described.

5. The combination in a device of the character described of the pan, the framing detachably secured to the top of said pan, said framing carrying two sections arranged in the same plane, each of said sections having pins projecting within the pan, and gearing for revolving said sections in opposite directions, the whole so arranged that the framing and the operating parts constitute a single structure, that can be readily removed from the pan, by withdrawing the pins from the dough, substantially as described.

6. The combination in a device of the character described of the pan having false partitions 11 whereby spaces 12 will be left in the sides thereof, holes 13 leading into said spaces 12, of the framing adapted to rest on top of the pan, said framing carrying two sections having pins projecting into the pan, and gearing for revolving said sections in opposite directions, of the clasps 15 mounted in said framing, each of said clasps having an arm 18 adapted to fit into one of the holes 13, and being bent upon itself as at 16 and 17, whereby the whole forms a spring clasp, substantially as described.

In testimony whereof I have hereunto set my hand in the presence of two subscribing witnesses.

JOHN H. WATSON.

Witnesses:
 LOUIS W. SOUTHGATE,
 H. W. COZZENS, Jr.